(12) United States Patent
Long et al.

(10) Patent No.: US 6,274,093 B1
(45) Date of Patent: Aug. 14, 2001

(54) SELF-REGULATING HYDROGEN GENERATOR

(75) Inventors: Eugene Long, Lafayette; Jeffrey A. Schmidt, Superior; Frank Lynch, Conifer, all of CO (US)

(73) Assignee: Ball Aerospace & Technologies Corp., Broomfield, CO (US)

( * ) Notice: Subject to any disclaimer, the term of this patent is extended or adjusted under 35 U.S.C. 154(b) by 0 days.

(21) Appl. No.: 09/130,395

(22) Filed: Aug. 6, 1998

(51) Int. Cl.⁷ ....................................................... B01J 7/02
(52) U.S. Cl. ................................. 422/129; 422/113; 48/61
(58) Field of Search ......................... 48/61; 252/188.25, 252/188.26; 422/113, 129; 423/648.1

(56) References Cited

U.S. PATENT DOCUMENTS

| | | |
|---|---|---|
| 2,334,211 | 11/1943 | Miller . |
| 3,174,833 | 3/1965 | Blackmer .......................... 422/111 |
| 3,346,506 | 10/1967 | Beumel, Jr. .................... 252/188.25 |
| 3,450,638 * | 6/1969 | Edwards ........................ 252/183.14 |
| 3,734,863 | 5/1973 | Beckert et al. ................. 252/188.25 |
| 3,862,052 | 1/1975 | Beckert et al. ................. 252/188.25 |
| 3,977,990 | 8/1976 | Beckert et al. ................. 252/188.25 |
| 4,155,712 | 5/1979 | Taschek ............................... 422/239 |
| 4,261,955 | 4/1981 | Bailey, Jr. et al. ................. 422/239 |
| 4,341,651 | 7/1982 | Beckert et al. ................. 252/188.25 |
| 4,604,151 | 8/1986 | Knowlton et al. ..................... 149/35 |
| 4,673,528 | 6/1987 | Artz et al. ........................ 252/188.25 |
| 4,737,161 | 4/1988 | Szydlowski et al. ................... 48/61 |
| 4,755,190 | 7/1988 | Harris ...................................... 48/61 |
| 5,064,627 * | 11/1991 | Zwart et al. ..................... 423/658.2 |
| 5,593,640 * | 1/1997 | Long et al. ........................... 422/129 |

FOREIGN PATENT DOCUMENTS

107497 * 5/1984 (EP) .

OTHER PUBLICATIONS

Dilts, et al., 1972, *Inorganic Chemistry*, 11(6):1230–1236.
Ward, et al., 1993, *Journal of Power Sources* 41:335–352.

* cited by examiner

*Primary Examiner*—Hien Tran
(74) *Attorney, Agent, or Firm*—Sheridan Ross PC

(57) ABSTRACT

A hydrogen generating apparatus that includes a reactant with a vapor phase at greater than atmospheric pressure. The apparatus includes a tank for housing the reactant, such as ammonia. Ammonia communicates with a reactor having a solid reactant, such as lithium aluminum tetrahydride. A check valve is located between the tank and the reactor and is used to control the flow of ammonia to the reactor. Heat generated by the reaction is useful in raising the temperature of the reactant in the tank. The reactor can also include a gas flow enhancing material that facilitates gas flow through the reactor. A filter and getters are employed downstream of the reactor to remove unwanted solids and impurities from the hydrogen gas stream.

22 Claims, 2 Drawing Sheets

SELF-REGULATING HYDROGEN GENERATOR

FIELD OF THE INVENTION

The present invention relates to generation of hydrogen and, in particular, to a portable apparatus for generating hydrogen using a reactant having a positive vapor pressure when at ambient temperature.

BACKGROUND OF THE INVENTION

The generation of hydrogen has been commonly performed for over 100 years through the hydrolysis of hydrides or other solid reactants. Previously, hydrogen generation has been advanced by employing the adiabatic hydrolysis and thermal decomposition of the chemical hydride in a portable lightweight unit. Such hydrogen generation technologies are characterized by heating the chemical hydride to a predetermined temperature. The chemical hydride is preferably lithium aluminum tetrahydride ($LiAlH_4$) and the predetermined temperature is greater than about 100° C. Only after the chemical hydride reaches the predetermined temperature is water supplied for hydrolysis of the chemical hydride.

With respect to such a portable hydrogen generator, it may be more suitable to employ a reactant other than water to avoid some of the requirements when water is utilized. In particular, use of water requires a controlled pump mechanism that pumps the water from the water supply for reaction with the chemical hydride at pressures greater than ambient atmospheric. Furthermore, as just noted, in connection with proper preparation for reaction with the water, the chemical hydride must be heated to a high temperature before allowing the reaction to occur. Such a system may only be operated above 0° C. This results in additional heating materials or components in order to implement a fully operational unit that outputs the desired hydrogen gas. Such a prior art hydrogen generator also has a buffer to handle excess hydrogen generated when the apparatus is shut down and can also serve to smooth hydrogen demand swings during normal operation. It is preferred that this system have a restart capability after a long (days to weeks) shutdown period. In considering these aspects, it would be advantageous to provide a hydrogen generating apparatus that is fully operational and satisfies all specified power demands, or other performance criteria, while eliminating one or more of the afore-noted hardware requirements that must be incorporated when water is utilized as the reactant with the chemical hydride.

SUMMARY OF THE INVENTION

In accordance with the present invention, a portable hydrogen generator apparatus is provided that produces hydrogen as a result of the chemical reaction between a solid reactant and a reactant or composition that is supplied to the solid reactant. The supplied or input reactant has a composition with a majority thereof, by at least one of weight and volume, being different from water. Preferably, the input reactant has a positive vapor pressure (greater than atmosphere) when exposed to the solid reactant at a temperature of between ambient and −40°. In one embodiment, the input reactant includes anhydrous ammonia ($NH_3$) and the solid reactant is a hydride that includes lithium aluminum tetrahydride ($LiAlH_4$)

The apparatus includes a tank for housing the supplied reactant, such as the ammonia. It is desired that the ammonia in the tank be available at a pressure greater than atmospheric pressure. The absolute, theoretical minimum operating temperature is that temperature at which ammonia's vapor pressure equals atmospheric pressure. At sea level, this occurs at −33° C. (−27° F.).

A flow control assembly communicates with the tank and is located downstream therefrom. The flow control assembly can include a valve member or check valve that opens or closes, as a function of the difference in pressure between the pressure in the tank due to the ammonia gas and the pressure in the reactor, primarily based on the hydrogen gas. More specifically, the valve member closes when the reactor pressure exceeds the ammonia pressure. The flow control assembly can also include a restrictor member that communicates with the output of the valve member. The restrictor member limits the maximum rate of ammonia injection and, accordingly, acts as a damper on the reaction rate. In one embodiment, the restrictor member can be a constriction in the supply tube that carries ammonia from the valve member to the reactor. The apparatus also includes a particle filter that may be included within the reactor adjacent its output end. The particle filter acts to prevent solid particles from escaping the reactor so that, essentially, only a combination of gases exits the reactor.

The reactor contains the lithium aluminum tetrahydride ($LiAlH_4$), or other satisfactory solid reactant, from which hydrogen gas can be generated using the input reactant, such as the ammonia, that is supplied to the reactor at relatively low temperatures. In that regard, not only does the ammonia have a relatively lower temperature, for a given pressure, at which it becomes a vapor, but such ammonia has a relatively significantly lower latent heat of vaporization parameter than, for example, water. In particular, the magnitude of the latent heat of vaporization parameter for ammonia is about 5.58 kcal/mole, while the magnitude of the latent heat of vaporization parameter for water is about 9.7 kcal/mole. The latent heat of vaporization parameter relates to the amount of energy that is required to cause the particular reactant or composition, such as ammonia or water, to change from a liquid phase to a vapor.

The output from the reactor includes a combination of gases, commonly including hydrogen gas, together with trace ammonia and trace organic vapor. Since it is necessary that the apparatus only output the hydrogen gas, the trace ammonia and the trace organic vapor must be trapped or removed. The apparatus further includes a trap or ammonia ($NH_3$) getter that communicates with the various gases output by the reactor. The ammonia getter substantially removes the ammonia from the gas stream output by the reactor. In one embodiment, the ammonia getter includes a sulfuric acid composition; however, other compositions could be used that have acidic properties such as sodium hydrogen sulfate or its monohydrate. A second trap or organic vapor removal unit is also provided. The second trap is typically separate from, but adjacent to, the ammonia getter. This second trap substantially removes organic vapors, such as the organic vapor, as well as ammonia or other reactants that still might be present in the gas stream after it exits the ammonia getter. In one embodiment, the second trap includes activated carbon, such as charcoal.

The apparatus also includes an output or manual valve that is in the gas flow path downstream of the organic vapor trap. The gas stream input to the output valve is essentially all hydrogen gas. When the user or operator of the apparatus wishes to use the generated hydrogen gas as a fuel source, such as to a fuel cell or other load, the operator opens the output valve to permit the release or input of the hydrogen gas to the fuel cell.

With regard to the method of operation of the present invention, in the embodiment in which ammonia is contained in the tank in a gaseous state and the gas in the tank is to be input to the reactor, when such gas pressure is sufficiently greater than the gas pressure in the reactor, the valve member, such as a check valve, opens and establishes a gas communication path from the tank to the reactor. In the reactor, the ammonia gas flows through the reactor and reacts with the solid reactant, such as the hydride, to produce hydrogen gas. In one embodiment, in addition to the hydride, a gas flow enhancing material, such as a vermiculite additive, is provided within the reactor and contributes to or otherwise enhances desired flow of the input gas through the reactor in order to prevent unwanted clogging. Preferably, such a gas flow enhancing material is greater than 5% by volume of the total volume occupied by the hydride(s) and the gas flow enhancing material. The maximum volume of such a gas flow enhancing material is preferably less than about 25% of such total volume. The gas stream generated within the reactor passes through the particle filter, which removes unwanted minute solid particles that might be carried by or be otherwise present in the gas stream. The gas stream output from the reactor is received by the ammonia getter that acts to remove the trace ammonia that might be present in the gas stream. The second or organic vapor getter or trap then removes organic vapors, that may be ether or could be other organic vapors, that are present in the gas stream from the reactor. Additionally, the activated carbon of this trap can also assist in removing unwanted ammonia gas that might be present. The resulting hydrogen gas from the second trap communicates with the output valve so that the operator can, when desired, open the valve to permit hydrogen gas flow to the fuel cell, for example.

In conjunction with its operation, when the generated hydrogen gas causes the pressure inside the reactor to increase to a sufficient pressure greater than the pressure applied to the valve member by the ammonia, such greater pressure causes the valve member to close. As a consequence, further ammonia is prevented from flowing into the reactor and control of generation of the hydrogen gas is achieved. Additionally, the tank is of a geometry, made of a material and located sufficiently adjacent to the reactor so that increases in temperature and concomitant heat resulting from the reaction is applied to the tank to increase the temperature thereof. This "heat pipe" feature facilitates or ensures the presence of desired ammonia gas within the tank for release to the reactor when the pressure in the reactor is essentially below the pressure in the tank.

Based on the foregoing summary, a number of advantages of the present invention are readily seen. A hydrogen gas generating apparatus and method are provided that utilize an input reactant different from substantially only water. Preferably, the input reactant has a vapor phase at a pressure greater than atmospheric and at a temperature substantially lower than the boiling temperature of water, preferably less than 0° C. In such an embodiment, the reactant can include ammonia. The reactor and the tank housing the ammonia are suitably positioned relative to each other so that heat generated by the reaction in producing the hydrogen gas is used to increase the temperature of the tank containing the ammonia. A check valve automatically regulates the supplying of ammonia gas to the reactor based on a pressure difference between the reactor and the tank. A filter and two getters or traps are employed to remove unwanted solids or gases from the hydrogen gas stream including a particle removal filter, an ammonia getter and an organic vapor getter. In addition to the chemical hydride in the reactor, it can also include a gas flow enhancing material in sufficient volume to eliminate clogging problems that negatively impact the generation of the hydrogen gas. Unlike prior art apparatuses that utilize water, no pump is required to pump the ammonia into the reactor. No substantial heating of the hydride or solid reactant is required since the ammonia is present in a pressurized vapor state at substantially lower temperatures. A hydrogen gas buffer adjacent the output of the apparatus may be eliminated since there may be essentially no delay in generation of hydrogen gas on demand by the user. The apparatus of the present invention is also compact, configurable into a variety of desired geometries and is lightweight.

Additional advantages of the present invention will become readily apparent from the following discussion, particularly when taken together with the accompanying drawings.

DETAILED DESCRIPTION

Figure 1:
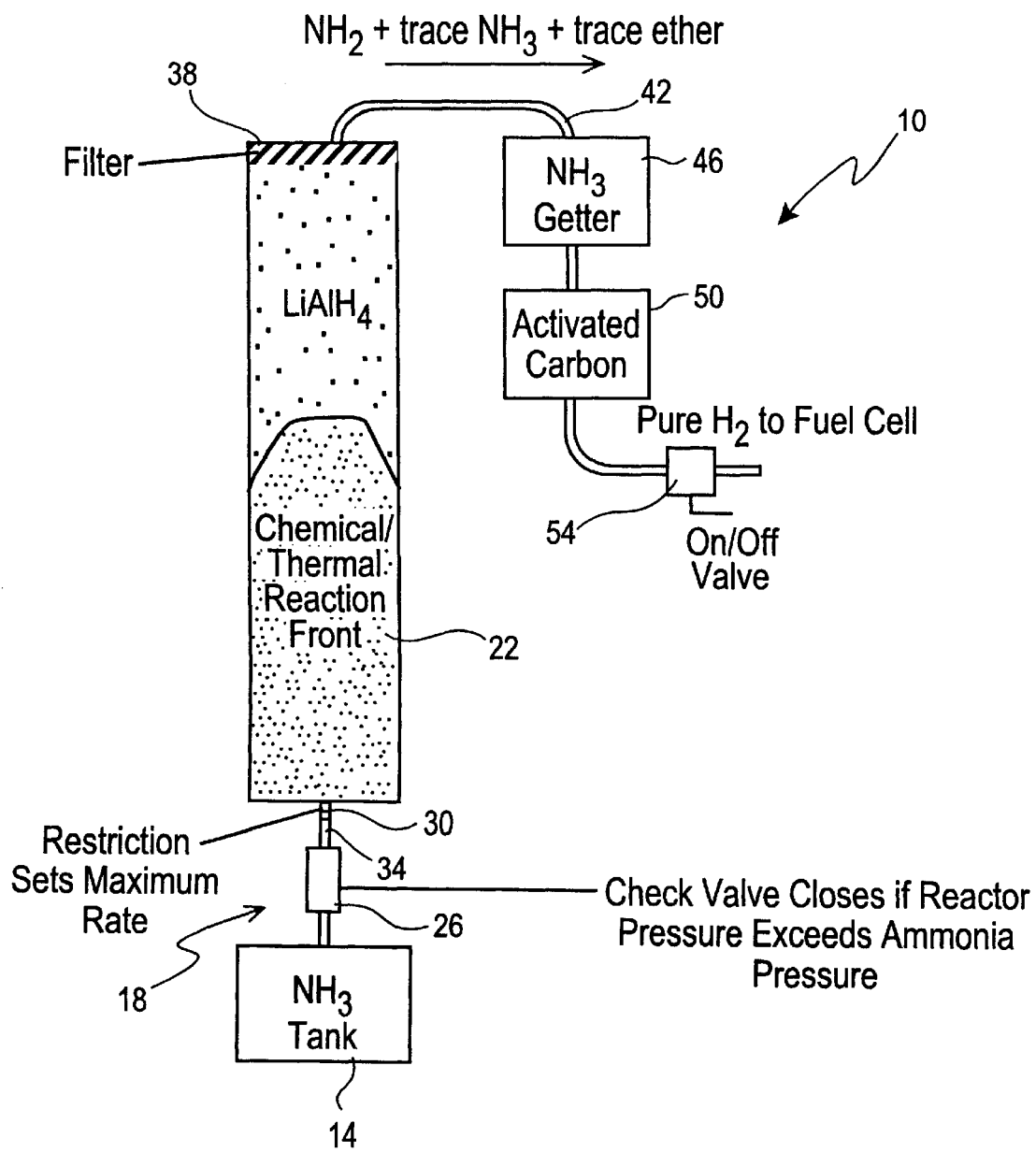
FIG. 1 is a schematic illustration of the hydrogen gas generating apparatus.

With reference to FIG. 1, a portable hydrogen generating apparatus 10 is schematically illustrated. The apparatus 10 includes a tank 14 for containing the input reactant or composition that is to react with a solid reactant, such as a hydride, to produce hydrogen. In the preferred embodiment, the majority of the input reactant composition is different from water and/or has a vapor pressure greater than atmospheric at least after exiting the tank 14 and when at a temperature of between ambient temperature and −40° C. The reactant includes at least one of the following: anhydrous ammonia, hydrous ammonia and hydrogen rich compositions that have positive vapor pressures when subject to a temperature equal to and less than ambient temperature. One acceptable reactant is anhydrous ammonia. Potential reactants for hydrogen production can be categorized according to certain parameters including a heat of vaporization parameter and low boiling point relative to water. The magnitude of the heat of vaporization parameter of a composition is a function of the energy necessary to change the particular composition from a liquid phase to a vapor. The heat of vaporization parameter associated with ammonia is substantially less than that of water and a lower boiling point than water (by 133° C.).

As also seen in FIG. 1, a flow control assembly 18 is disposed between the reactant tank 14 and a reactor 22. The flow control assembly 18 controls flow of reactant from the tank 14 to the reactor 22 so that a proper amount of reactant is being input to the reactor 22 during operation of the apparatus 10. Where the input reactant from the reactant tank 14 is a liquid or a vapor, such as ammonia , the flow control assembly 18 includes a check valve 26 that allows the ammonia to flow in only one direction, namely, away from the reactant tank 14 towards the reactor 22. In one embodiment, the flow control assembly 18 also includes a restrictor member downstream of the valve member 26 that is used to limit the maximum rate of ammonia injection to the reactor 22. The restrictor member 30 can include a constriction or other reduction in the reactant supply line 34 that carries the ammonia to the reactor 22.

The reactor 22 includes the solid reactant, such as the hydride, that reacts with the ammonia or other reactant input to the reactor 22. In a preferred embodiment, the hydride consists essentially of lithium aluminum tetrahydride (LiAlH$_4$). The input ammonia reacts with the hydride to generate hydrogen gas in the reactor 22. The hydrogen is generated by two types of reactions. The ammonia (NH$_3$) reacts chemically with the lithium aluminum tetrahydride producing hydrogen. The heat from this exothermic reaction drives the thermal decomposition of LiAlH$_4$ and, at higher temperatures, intermediate species such as trilithium aluminum hexahydride (Li$_3$AlH$_6$). The gaseous product of thermal decomposition is hydrogen.

The thermal decomposition is endothermic. It absorbs the heat from the exothermic chemical reaction. The net process may be made virtually adiabatic, except for the heat loss through the walls of the reactor 22. More specifically regarding the ammonia-hydride reactions, the reaction between NH$_3$ and LiAlH$_4$ is essentially spontaneous and rapid at room temperature. The primary product of the reaction is hydrogen. A tubular reactor with NH$_3$ entering at one end produces nearly pure hydrogen at the other end as a hot reaction zone moves through the tubular reactor 22. The hydrogen product contains trace levels of NH$_3$ and a solvent vapor, which may be an organic. The heat produced by the reaction is sufficient to drive thermal decomposition of some of the hydrides according to the following:

$$3\text{LiAlH}_4 \rightarrow \text{Li}_3\text{AlH}_6 + 2\text{Al} + 3\text{H}_2.$$

With sufficient heat generation, it is also possible that the following occurs:

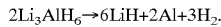

$$2\text{Li}_3\text{AlH}_6 \rightarrow 6\text{LiH} + 2\text{Al} + 3\text{H}_2.$$

In that regard, reaction of Li$_3$AlH$_6$ with NH$_3$ near room temperature is extremely slow but does occur at measurable rates above 80° C. Li$_3$AlH$_6$ cannot be the primary ammonolysis reactant because it will not result in the desired reaction at low starting temperatures. However, at higher temperatures during LiAlH$_4$ ammonolysis, the LI$_3$AlH$_6$ resulting from the thermal decomposition of LiAlH$_4$ may produce a portion of the hydrogen product.

In addition to the suitable hydride, it may be necessary to include a gas flow enhancing material in the reactor 22. Testing has shown that clogging can occur in the reactor 22. It has been observed that clogs occur just behind the reaction front and break free as the front passes. This conclusion has been reached based on pressure drop versus flow measurements indicating that the hydride ahead of the reaction front flows freely and the products behind the reaction front flow freely. Clogging is associated with a large pressure drop. This may have the effect of forcing the ammonia to flow through regions that are surrounded by the reaction products. Higher peak temperatures would therefore result from increased ammonolysis per unit of hydride volume. Clogging has the effect of increasing hydrogen production capacity and temperature of the reaction front. Secondary effects that may contribute to high hydrogen yield at the elevated peak reaction temperatures observed during clogging are ammonolysis and thermal decomposition of Li$_3$AlH$_6$ which is a product of thermal decomposition of LiAlH$_4$.

Regardless of any ammonolysis or thermal decomposition of LI$_3$AlH$_6$, the higher hydrogen yields were precipitated by clogging. The net result of clogging is more reaction per unit of hydride volume and that results in higher temperatures. However, the rapid pressure fluctuations and erratic flow during episodes of clogging are not tolerable.

In some tests, a vermiculite additive was included in the reactor 22 with the chemical hydride to improve gas flow and avoid clogging. As much as 15% by volume in the reactor 22 of vermiculite additive was included. These tests indicated that no significant clogging occurred and peak temperatures reached due to the reaction were acceptable.

The reactor 22 also includes a filter 38 adjacent its output end for removing minute solid particles that may be entrained in the gas stream that exits the reactor 22. Consequently, the output from the reactor 22 is virtually all gas. The gaseous composition output from the reactor 22 is defined as: output gas stream=H$_2$+trace NH$_3$+trace organic vapor. Since this output gas stream is not essentially pure hydrogen and contains unwanted gaseous substances, the gas stream must be further processed. The output gas stream is carried by an output gas line 42 to a first trap or ammonia getter 46 that removes or getters substantially all of the ammonia that might be present in the gas stream. In one embodiment, the ammonia getter 46 can include relatively small amounts of sulfuric acid (H$_2$SO$_4$). The sulfuric acid wets a suitable absorbent material, such as a column of fiberglass wool. The gas stream output from the ammonia getter 46 is then received by a second trap 50 for removing organic vapor, such as the trace organic vapor, that can be present, as well as removing any remaining ammonia that might be present. The second trap 50 can include an activated carbon, such as charcoal, for performing this filtering or removal function. The output from the organic vapor trap 50 is substantially pure hydrogen gas. The flow of the hydrogen gas is controlled by an output valve 54, which can be a simple but effective on/off valve. When the output valve 54 is open, hydrogen gas present is supplied to a load or device, such as a fuel cell, that is powered by the hydrogen gas. When the hydrogen is not needed, the output valve 54 may be, but need not be, in its off or closed position.

Figure 3:
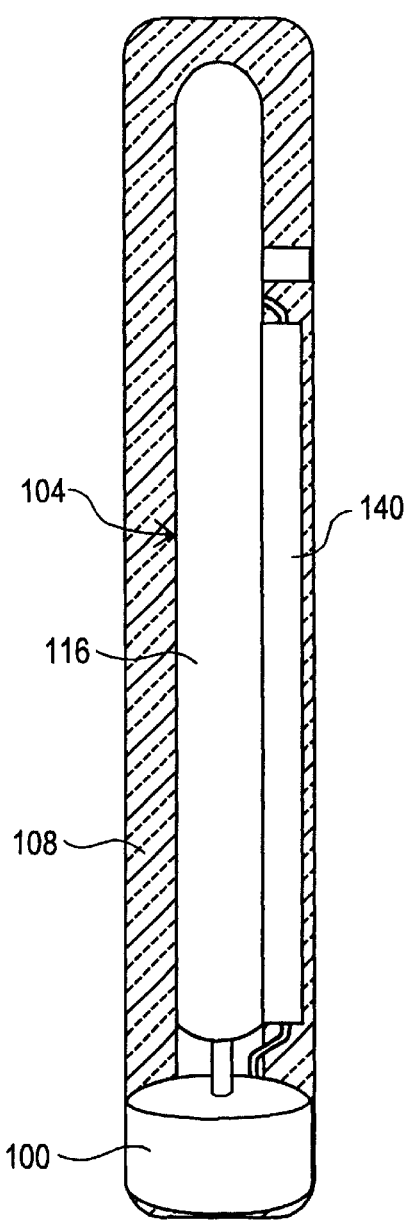
FIG. 3 is a side view schematically illustrating the embodiment of FIG. 2.
Figure 2:
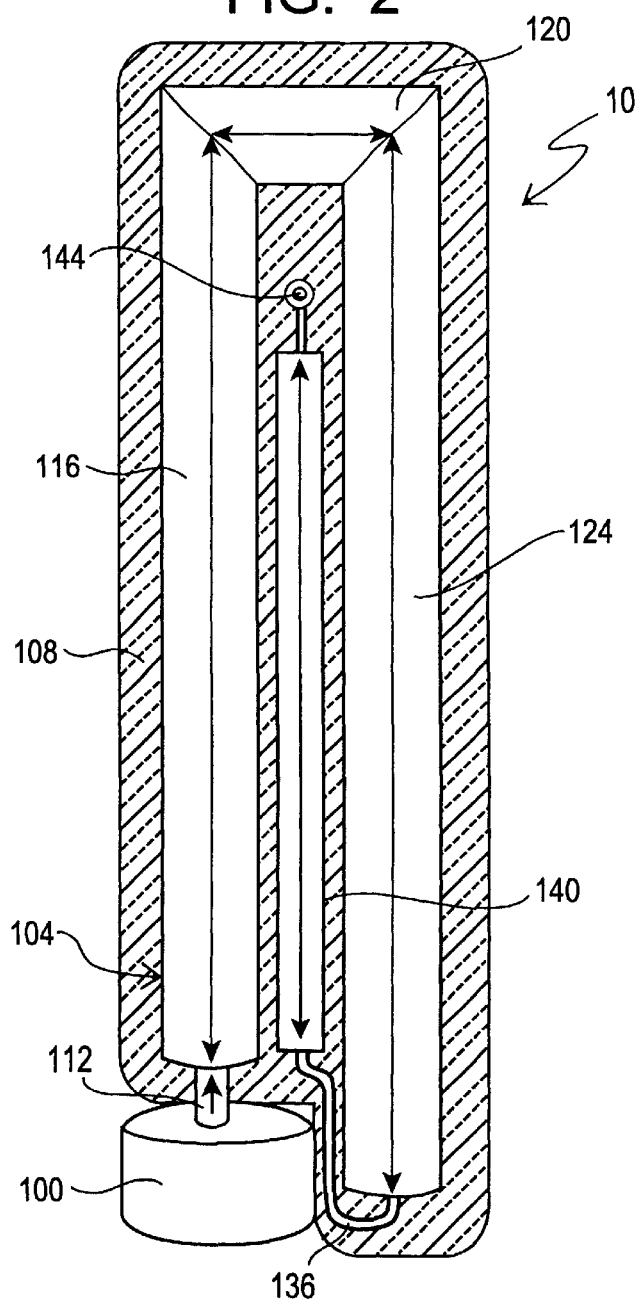
FIG. 2 is a schematic front plan view of one embodiment of the apparatus depicting relative sizes and arrangements of components of the apparatus.
Figure 4:
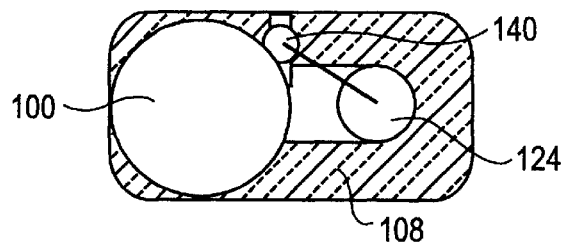
FIG. 4 is a bottom view schematically illustrating the embodiment of FIG. 2.

With reference to FIGS. 2–4, one embodiment for implementing the hydrogen generation apparatus 10 is illustrated. FIG. 2 illustrates a tank 100 for containing ammonia, or other suitable reactant that can react with the desired hydride or other solid reactant. The suitable input reactant has a composition in which the majority thereof, by at least one of weight and volume, is different from water. The output of the ammonia tank 100 is in communication with a reactor 104. In one embodiment, the reactor 104 is surrounded by insulation material 108 for use in containing the heat of reaction when the ammonia reacts with the chemical hydride, such as the lithium aluminum tetrahydride (LiAlH$_4$). The insulation protects the user from high reaction temperatures (>200° C). The ammonia tank 100 is in close proximity to the reactor 104 and is not surrounded by the insulation material 108. The ammonia tank 100 cools below ambient temperature and absorbs heat from the air as it boils. Vapor pressure can also be used to drive liquid through the check valve 112 and boiling can then occur in the reactor 104. As previously described, a check valve or other valve member 112 is disposed between the ammonia tank 100 and the reactor 104 and is used in controlling the passage of ammonia to the reactor 104. Preferably, the ammonia tank 100 is sufficiently adjacent to the reactor 104 such that the heat of reaction during operation results in heat being applied to the ammonia tank 100. This heat causes the temperature of the ammonia tank 100 to increase and thereby contributes to boiling of ammonia in the tank 100. In this embodiment, the insulation material 108 is intended to contain the heat of the reaction about the reactor 104 and limit its escape to the surrounding environment. In another embodiment, the insulation material 108 is not used. When the insulation material is not present, the weight of the apparatus 10 is reduced. With the insulation material 108 not present, it is thought that, if the peak temperature were reduced, there would be less thermal decomposition of the $LiAlH_4$ as the reaction front passed through the hydride. The reaction occurs over a longer period of time thereby reducing the possibility of unacceptable clogging.

As illustrated in FIGS. 2 and 3, the reactor 104 has an elongated configuration that is comprised of a first tubular section 116, a bridge tubular section 120 and a second tubular section 124. The second tubular section 124 essentially turns back on the first tubular section 116 by means of the bridge tubular section 120 in connection with achieving a desired smaller size and geometry. The hydride, such as the $LiAlH_4$, is disposed throughout the elongated tubular sections of the reactor 104 and settles to a degree for optimizing the production of hydrogen in a uniform manner, while achieving a required watt-hour density, such as 1 kw-hr/kg.

In one embodiment, the reactor 104 is made from Austenitic stainless steel. Such a specialty steel can provide greater strength per unit weight at high temperatures, comparable thermal conductivity, as well as compatibility with ammonia and hydrogen. In this embodiment, the total length of the reactor 104 is about 63.5 cm (25 in.) and a 2.7 cm I.D. (1.063 in.) tubing is provided. The wall thickness of the reactor tubing is about 0.018 cm (0.007 in.). When appropriate, a relatively small volume and weight of a flow enhancing or non-clogging material may be included with the hydride, such as the previously noted vermiculite additive.

The output end of the tubular reactor 104, as discussed in conjunction with FIG. 1, includes a solid particulate filter for removing relatively small particles that might be entrained in the gas stream that is generated within the reactor 104. The output gas stream from the reactor 104 is carried by a gas stream output line 136 to a filter and getter column 140. The filter and getter column 140 typically includes gettering compositions and/or devices for removing the trace ammonia and trace organic vapors that are commonly part of the output gas stream being carried by the output gas stream line 136. Preferably, the filter and getter column 140 includes an ammonia getter and an organic vapor removal composition, with the ammonia getter being upstream of the composition for removing the organic vapor. The gas stream output by the filter and getter column 140 is pure, or substantially pure, hydrogen gas that can pass to the load or device, which utilizes the hydrogen gas. Passage of the hydrogen gas is enabled/disabled using the output valve 144.

A further description of the process for generating hydrogen is now provided. The vapor pressure of ammonia is greater than atmospheric pressure down to −33° C. (−27° F.) at sea level. When the hydrogen generating apparatus is in storage or not being used, the valve member 112 is held closed by a charge of pressurized hydrogen within the tubular reactor 104. When a load or device is connected to the outlet of the apparatus 10 and the output valve 144 is manually opened, the hydrogen pressure begins to decrease. When such hydrogen pressure decreases below the pressure due to the ammonia in the tank 100, the valve member or check valve 112 opens and the ammonia reactant reacts with the hydride in the reactor 104 to produce more hydrogen gas. The reaction wave front moves through the tubular sections 116, 120, 124 and consumes the reactants ahead and leaves the products behind. The gas stream is filtered to remove any entrained minute solid particles and gettered to remove trace ammonia and trace organic vapor. The hydrogen gas output by the output valve 144 is received by the load or device and provides hydrogen thereto. As the hydrogen pressure in the reactor builds towards the ammonia pressure, the check valve 112 closes and stops the flow of ammonia. In one embodiment, the check valve 112 is configured with an offset by means of a spring that requires a predetermined amount of differential pressure before the check valve 112 opens. In light of the rapid startup for producing hydrogen when the output valve is opened, it appears unnecessary to utilize a buffer or storage unit for hydrogen that would immediately deliver hydrogen through the output valve 144 when it is opened after some period of inactivity of the hydrogen generating apparatus 10. That is, the relatively rapid input of ammonia to the reactor 104 results in an immediate reaction and production of hydrogen in the reactor 104 that can be immediately input to the communicating load.

Additional aspects of the operation of the apparatus 10 are noted. The absolute minimum operating temperature of the apparatus 10 at sea level is −33° C., which is the normal boiling point of ammonia. Because of pressure drops through the check valve 112, the reactor 104 and the filter and getter column 140, the minimum operating temperature is closer to −20° C. Reactor clogging can be eliminated or reduced through the addition of as little as 10% by volume of a vermiculite additive, or other functionally equivalent material, and by settling, rather than compacting, the chemical hydride powder. Alternatives to vermiculite may be available that could provide better porosity and greater hydrogen yield. Acceptable hydrogen yields, comparable to those that are generated at high reaction temperatures (greater than 200° C.), can be obtained in lower temperature reactions (about 100° C.) with an uninsulated reactor 104. Although anhydrous ammonia has been described as the preferred reactant, other reactants may be acceptable including hydrous ammonia and other compositions that have a positive vapor pressure at temperatures between ambient and −40° C. The reactant output from the reactant tanks might also be in a liquid state, such as where the liquid is drawn from the bottom of the tanks.

The foregoing description of the invention has been presented for purposes of illustration and description. Further, the description is not intended to limit the invention to the form disclosed herein. Consequently, variation and modification commensurate with the above teachings, within the skill and knowledge of the relevant art, are within the scope of the present invention. The embodiments described hereinabove are further intended to explain the best mode or modes presently known of practicing the invention and to enable others skilled in the art to utilize the invention in such, or in other embodiments, and with the various modifications required by their particular applications or uses of the invention. It is intended that the appended claims be construed to include alternative embodiments to the extent permitted by the prior art.

What is claimed is:

1. An apparatus for generating hydrogen, comprising:
ammonia in which a majority thereof, by at least one of weight and volume is different from water;
a solid reactant;
a tank that contains said ammonia, with said ammonia being associated with a first pressure in said tank;
a reactor that contains said solid reactant used in generating hydrogen gas; and a control device disposed between said tank and said reactor that controls movement of said ammonia from said tank to said reactor, wherein said control device allows said ammonia to pass therethrough depending on said first pressure of said ammonia in said tank and also depending on a second pressure in said reactor and wherein substantially only said control device controls passage of said ammonia between said tank and said reactor such that said control device is free of connection to any controller and pressure sensor used to control said control device.

2. An apparatus, as claimed in claim 1, wherein:
said ammonia has a latent heat of vaporization parameter lower than water.

3. An apparatus, as claimed in claim 1, wherein:
said ammonia includes at least one of the following: anhydrous ammonia, hydrous ammonia and hydrogen rich compositions that have positive vapor pressures when subject to a temperature equal to and less than ambient temperature.

4. An apparatus, as claimed in claim 1, wherein:
said control device includes a valve member that allows movement of said ammonia from said tank to said reactor.

5. An apparatus, as claimed in claim 1, wherein:
said ammonia in said tank that passes from said tank to said reactor through said control device is ammonia vapor.

6. An apparatus, as claimed in claim 1, wherein:
said tank is located adjacent to said reactor wherein said tank increases in temperature due to heat from said reactor.

7. An apparatus, as claimed in claim 1, further including:
means for substantially preventing unwanted substances from being part of hydrogen gas that is output from the apparatus.

8. An apparatus, as claimed in claim 7, wherein:
said ammonia includes ammonia vapor and said means for substantially preventing includes first means for substantially preventing solid particles from passing therethrough and second means for substantially preventing at least said ammonia vapor from passing therethrough.

9. An apparatus, as claimed in claim 7, wherein:
said ammonia includes ammonia vapor and said means for substantially preventing includes means located downstream of said solid reactant for substantially removing said ammonia vapor from hydrogen gas.

10. An apparatus, as claimed in claim 7, wherein:
said reactor contains unwanted organic fluids and said means for substantially preventing includes means located downstream of said solid reactant for substantially removing said unwanted organic fluids.

11. An apparatus, as claimed in claim 10, wherein:
said means for substantially removing said unwanted organic fluids includes an activated carbon material.

12. An apparatus, as claimed in claim 9, wherein:
said means for substantially removing said ammonia vapor includes at least one of sulfuric acid, sodium hydrogen sulfate and its monohydrate.

13. An apparatus, as claimed in claim 1, wherein:
said reactor further includes a gas flow enhancing material different from said solid reactant for increasing yield of hydrogen gas, and in which said gas flow enhancing material constitutes at least five percent by volume of the combination of said solid reactant and said gas flow enhancing material.

14. An apparatus, as claimed in claim 1, wherein:
said solid reactant includes a hydride.

15. An apparatus, as claimed in claim 1, wherein:
said solid reactant substantially continuously is at ambient temperature during the time said ammonia is not present in said reactor.

16. An apparatus, as claimed in claim 1, wherein:
said ammonia includes an ammonia vapor and substantially all of said ammonia passing from said tank to said reactor is said ammonia vapor.

17. An apparatus, as claimed in claim 4, wherein:
said valve member includes a check valve.

18. An apparatus, as claimed in claim 14, wherein:
said hydride includes lithium aluminum tetrahydride.

19. An apparatus for generating hydrogen, comprising:
ammonia in which a majority thereof, by at least one of weight and volume, is different from water;
a solid reactant;
a tank that houses said ammonia that includes at least a liquid phase and a vapor phase, wherein a first pressure is developed in said tank using said ammonia;
a reactor that houses at least said solid reactant for use in generating hydrogen gas, wherein a second pressure is developed in said reactor using hydrogen gas; and
a flow control member disposed between said tank and said reactor for controlling flow of said ammonia from said tank to said reactor using a difference between said first pressure and said second pressure;
wherein said flow control member allows said ammonia to pass from said tank to said reactor independently of any external controller and any pressure sensor and in which said solid reactant is substantially continuously at ambient temperature in said reactor during the time said ammonia is not present in said reactor.

20. An apparatus, as claimed in claim 19, wherein:
said ammonia includes one of the following: anhydrous ammonia, hydrous ammonia and hydrogen rich compositions that have a positive vapor pressure when at a temperature equal to or less than ambient temperature.

21. An apparatus, as claimed in claim 19, wherein:
said reactor also contains a gas flow enhancing material that by volume is at least 5 percent of the total volume of the combination of said solid reactant and said gas flow enhancing material.

22. An apparatus, as claimed in claim 19, further comprising:
means for substantially preventing at least said ammonia from being part of hydrogen gas that is generated and with said means for substantially preventing being positioned downstream of said solid reactant.

* * * * *

UNITED STATES PATENT AND TRADEMARK OFFICE
CERTIFICATE OF CORRECTION

PATENT NO. : 6,274,093 B1
DATED : August 14, 2001
INVENTOR(S) : Long et al.

Page 1 of 1

It is certified that error appears in the above-identified patent and that said Letters Patent is hereby corrected as shown below:

Drawings,
Sheet 1, Fig. 1, the output represented at the top of Fig. 1 should be:

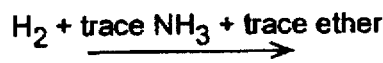

Signed and Sealed this

Twenty-third Day of April, 2002

Attest:

*Attesting Officer*

JAMES E. ROGAN
*Director of the United States Patent and Trademark Office*